INVENTOR
WILHELM UHRIG

3,671,284
PROCESS AND APPARATUS FOR APPLYING ADHESIVE POINTS TO A WEB OR SHEET IN A DESIRED PATTERN
Wilhelm Uhrig, Wuppertal-Elberfeld, Germany, assignor to Dr. Plate GmbH, Bonn, Germany
Filed Jan. 16, 1970, Ser. No. 3,300
Claims priority, application Germany, Jan. 18, 1969, P 19 02 506.0
Int. Cl. B44d 1/094
U.S. Cl. 117—21                    1 Claim

ABSTRACT OF THE DISCLOSURE

A process is provided for applying a desired pattern of adhesive areas or points to a moving web by arranging a layer of powdered thermosetting plastic adhesive material on the moving web and thereafter contacting a pattern of heated projections with the adhesive to melt or sinter the same at the points of contact. The excess and unheated powdered adhesive is removed by suction. The result is a pattern, such as a screen-like arrangement, of adhesive points on the web so that it may be bonded to another web or sheet by compression. The pattern is formed by a rotating heated roller having projections on its periphery, the ends of the projections successively contacting the adhesive layer on the moving web. The adhesive in contact with the ends melts and the remaining unheated powdered adhesive is removed by suction nozzle means to thereby provide the web with a screen-like pattern of adhesive points. To apply a similar pattern to the underside of the web, the adhesive layer is formed on an endless conveyor belt below the web. The rotating heated roller with the projections is located between the conveyor belt and the bottom of the moving web. As the roller rotates, the ends of the projections contact and melt the adhesive material and thereafter transfer the molten globules of adhesive to the bottom of the web to thereby form a screen-like pattern of adhesive points on the bottom or underside of the web.

---

This invention relates to a process and apparatus for the application of adhesive material to a web or sheet to form a pattern of bonding surfaces or points thereon.

Webs or sheets of textile, paper, foil, plastic, and similar materials, are laminated by applying a layer of adhesive, such as thermoplastic adhesive material, to the sheets. Thereafter, the prepared webs or sheets are subjected to compression and heat to set the adhesive and cause the bonding of the sheets to each other. Such bonding requires a relatively large amount of adhesive material. It also reduces the degree of flexibility in the laminated structure. The continuous layer of adhesive material further results in a loss of permeability in laminated textile webs, where permeability is desirable.

In lieu of a continuous layer of adhesive material, a pattern of small adhesive areas or points between adjacent sheets or webs of the material has been used. Such a pattern reduces the stiffness and increases the permeability of the laminated structure and, in these respects, offers advantages over the use of a continuous layer of adhesive. Further, the use of a pattern of small areas of bonding is more economical in the use of adhesive material than a continuous adhesive layer.

An object of this invention is a process whereby a pattern of small adhesive areas or points may be applied to a moving textile web in an economical and simple manner.

Another object is to provide a process for applying a pattern of adhesive surfaces on a textile web or sheet in the form of a screen or grid of adhesive points.

Another object is to provide apparatus to carry out the above process economically and effectively.

A further object is to provide apparatus to apply a pattern of adhesive points to the top of a moving web or sheet and also to apply a similar pattern to the bottom of a moving web or sheet.

Further objects and advantages will be apparent from the following description and accompanying drawings.

Referring to the drawings.

Figure 1:
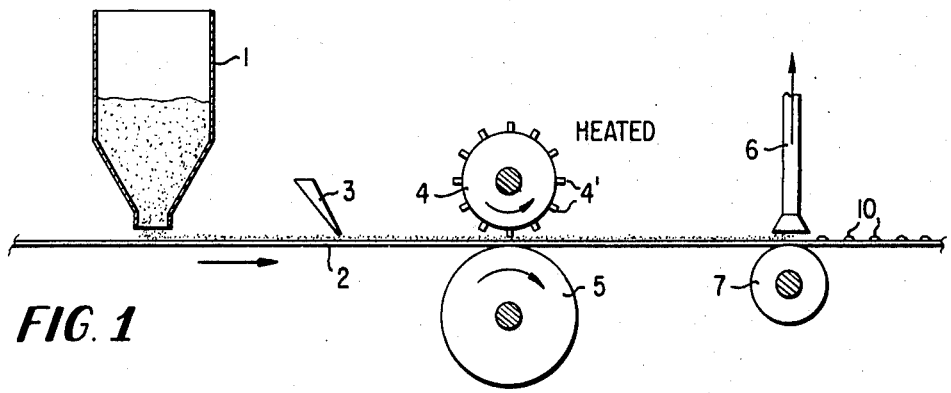
FIG. 1 illustrates diagrammatically an arrangement for applying a desired pattern of adhesive areas or points to the top of a moving web or sheet of material.

Referring to FIG. 1, the dry adhesive material is stored in hopper 1. There are many commercially available dry adhesive or bonding mediums, but an adhesive comprising powdered, thermosetting plastic material is preferred in the disclosed process. The powdered adhesive material is fed from hopper 1 on moving web of material 2 which is to be bonded to either a web of similar material or to other material. The adhesive material fed on web 2 is spread in an even layer by means of spreader 3 located a proper distance from hopper 1.

A roller 4, provided with a series of teeth or projections on its periphery, the projections designated by the reference numeral 4', is heated by suitable means (not shown). Roller 4 extends across the web and its projections 4' form circumferential rows and longitudinal rows thereon, the circumferential rows $a$ and the longitudinal rows $b$ being illustrated in FIG. 3. The number of projections 4' circumferentially arranged around the periphery of roller 4 to form a row $a$ and the number of circumferential rows $a$ along the axis of roller 4 will depend upon the spacing pattern of adhesive areas or points desired and the extent of the pattern transversely of the web. Thus, a large number of projections 4' on a roller 4 of a given size will give a large number of adhesive areas or points per unit of web area.

The ends of projections 4' may assume various cross-sectional shapes and have various surfaces. Thus, the cross-section along the ends of the projections may be square or round, and the end surfaces may be curved, flat or cupped. Projections 4' are sufficiently heated to melt the adhesive material which then ends contact as they rotate over the moving web above the revolving support roller 5. As the web leaves rollers 4 and 5, the layer of adhesive on its top comprises a pattern of molten or heated globules of adhesive with dry powdered adhesive material between adjacent points of molten adhesive.

The dry powdered adhesive material is removed from the moving web by suction means 6. Means 6 may be in the form of a suction nozzle means located above a vibrating means 7. Nozzle 6 extends across the adhesive pattern and, in cooperation with vibration means 7, sucks up and removes all loose adhesive powder, leaving a screen-like or grid pattern of adhesive points. Thus, when the moving web leaves powder-removing means 6 and 7, it has a screen-like pattern of adhesive points or areas designated by reference numeral 10. The adhesive points 10 extend across the web over the desired bonding area.

Figure 3:
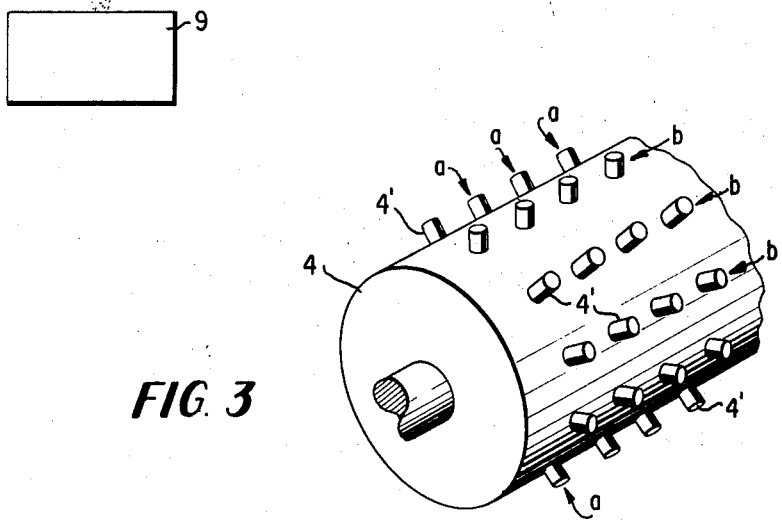

The projections 4' may be spaced on the periphery of roller 4 in any desired pattern. FIG. 3 illustrates uniform, aligned rows $a$ and $b$ of projections 4'. However, the spacing of projections 4' may be staggered. Regardless of the specific arrangement of the projections on roller 4, they will apply a grid-like pattern of adhesive areas or points to moving web 2.

Figure 2:
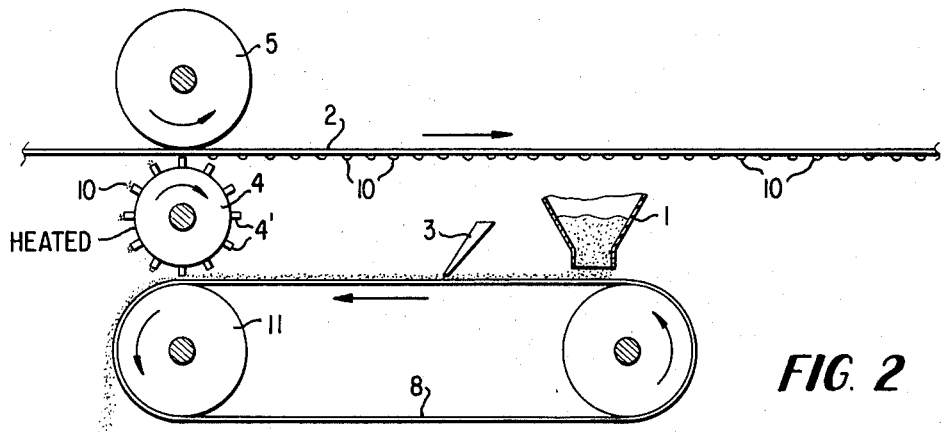
FIG. 2 illustrates an arrangement similar to that of FIG. 1 to apply the pattern of adhesive areas to the bottom or underside of the moving web; and, FIG. 3 is a perspective view of a portion of the roller with projections thereon forming an element of the apparatus.

FIG. 2 illustrates the apparatus for applying a pattern of adhesive points 10 to the bottom or underside of web 2. Hopper 1 feeds a layer of powdered thermosetting plastic adhesive material to a moving conveyor belt 8 which is as wide as the web or the adhesive pattern to be applied thereto. The belt is preferably made of polytetrafluoroethylene. The wiper 3 spreads the adhesive powder to form a uniform layer on the top reach of belt 8. The roller 4 is provided with projections 4′ which are arranged as in the arrangement of FIG. 1. The roller is located above belt 8, preferably above the point at which belt 8 contacts its end roller 11. Roller 4 is heated by suitable means (not shown) to a degree at which projections 4′ are sufficiently hot to melt or sinter the adhesive which their ends contact to form adhesive points or globules 10. Projections 4′ or their ends may be formed of or coated with polytetrafluoroethylene to prevent undue adherence of globules or masses 10 thereto. Thus, as roller 4 rotates, molten adhesive material 10 is transferred to web 2 along the area supported by roller 5. The powdered adhesive which is not contacted by heated projections 4′ falls into container 9 as belt 8 moves over roller 11 into its lower reach phase. Thus, web 2 leaves rollers 4 and 5 with a screen-like or grid pattern of adhesive points on its bottom or underside.

Thereafter, web 2 with its adhesive pattern continues to move to the station whereat it is aligned with the other webs or sheets to which it is laminated by being subjected to pressure and cooling steps well-known in the art.

By combining the arrangements of FIGS. 1 and 2, both sides of web 2 may be concurrently or successively coated with the adhesive pattern as it moves along the processing path.

Although certain preferred embodiments of the invention have been disclosed for purpose of illustration, it will be evident that various changes and modifications may be made therein without departing from the scope and spirit of the invention.

What is claimed is:

1. A process for applying a pattern of small adhesive areas to a moving flexible web or sheet to form bonding points for lamination, under compression and heat, to another web or sheet and thereby cause the bonding of the sheets to each other, said process consisting essentially of:

(a) depositing dry thermosetting plastic powdered adhesive material onto a moving polytetrafluoroethylene conveyor belt which is as wide as the web to which the pattern of adhesive is to be applied;
(b) spreading the adhesive powder to form a uniformly thick layer;
(c) applying to the said layer from a location above the belt a rotating roller having heated projections thereon to melt the powdered adhesive and form globules of molten adhesive adhering to said projections;
(d) transferring said globules to the underside of said moving web from said projections, said moving web being located above said belt, and thereby forming a pattern of molten adhesive globules along the width of said web, said pattern of molten adhesive providing, after bonding, a flexible laminated product in continuous manner.

References Cited

UNITED STATES PATENTS

| | | | |
|---|---|---|---|
| 2,513,434 | 7/1950 | Tinsley | 117—21 |
| 2,721,153 | 10/1955 | Hopf | 117—212 |
| 396,220 | 1/1889 | Masters | 117—22 |
| 2,503,758 | 4/1950 | Murray | 117—37 R |
| 2,677,622 | 5/1954 | Schouteden | 117—21 |
| 2,820,716 | 1/1958 | Harmon et al. | 117—21 |
| 3,002,849 | 10/1961 | Harmon et al. | 117—21 |
| 3,028,251 | 4/1962 | Nagel | 117—21 |
| 3,032,816 | 5/1962 | Zimmerli | 117—21 |
| 3,039,987 | 6/1962 | Elbling | 117—21 |
| 3,079,290 | 2/1963 | Marshall | 161—148 |
| 3,150,023 | 9/1964 | Penman | 117—21 |
| 3,251,727 | 5/1966 | Reynolds et al. | 161—148 |
| 3,389,016 | 6/1968 | Holtz et al. | 117—11 |

FOREIGN PATENTS

| | | | |
|---|---|---|---|
| 971,434 | 9/1964 | Great Britain | 117—21 |
| 968,667 | 9/1964 | Great Britain | 161—148 |
| 648,727 | 9/1962 | Canada | 117—37 |

WILLIAM D. MARTIN, Primary Examiner

R. M. SPEER, Assistant Examiner

U.S. Cl. X.R.

117—16, 19, 25, 37 R; 118—50, 59, 202, 211; 161—148